Patented Sept. 12, 1933

1,926,447

UNITED STATES PATENT OFFICE 1,926,447

YELLOW TO RED PIGMENT

Ekbert Lederle, Ludwigshafen-on-the-Rhine, and Hans Georg Grimm, Heidelberg, Germany, assignors to I. G. Farbenindustrie Aktiengesellschaft, Frankfurt-on-the-Main, Germany No Drawing. Application August 10, 1931, Serial No. 556,310, and in Germany August 14, 1930

8 Claims. (Cl. 134—67)

The present invention relates to yellow to red pigments and process of producing same.

We have found that mixed crystals from lead molybdate or lead tungstate and lead chromate are especially suitable as yellow pigments by reason of their high covering power and color strength. For example mixed crystals of the composition: 95 per cent of $PbCrO_4$ and 5 per cent $PbWO_4$ have a covering power amounting to more than double that of pure lead chromate. The covering power is not appreciably diminished when a part of the lead is replaced by the cheaper barium or strontium, thereby partly equalizing the extra cost of the product due to the content of tungstic or molybdic acid. Similarly, lead sulphate may be introduced as a further component in the mixed crystals whereby surprisingly the color of the mixed crystals is changed towards scarlet red and the color strength and the covering power are substantially improved. The preparation may be effected by intimately mixing the components in the moist state and allowing them to recrystallize. The mixed crystals are preferably prepared, however, by precipitating the components from a common solution. The components probably first precipitate separately but rapidly combine to form mixed crystals by reason of their intimate admixture. This process may be clearly followed by the change in the color of the precipitate. Thus for example, a pigment having the composition, 75 per cent of $PbCrO_4$, 20 per cent of $PbSO_4$ and 5 per cent of $PbMoO_4$ is first precipitated as a lemon yellow precipitate but changes in the course of half an hour to a brilliant scarlet red color. The formation of the mixed crystals may even be effected by the conversion of lead compounds difficultly soluble in water with a solution which contains the necessary anions, as for example by treating lead compounds which are insoluble or difficultly soluble in water with an aqueous solution of chromates and tungstates and/or molybdates.

In addition to the absence of lead oxide, the said red and orange colored products have the special advantage of an excellent strength. Thus, the scarlet red pigment already mentioned has a covering power about ten times as great as the usual chrome red having the composition $PbO.PbCrO_4$.

Particularly valuable are the pigments containing between 40 and 95 per cent of lead chromate, between 2 and 15 lead molybdate, the rest being lead tungstate or lead sulphate, in view of their color strength and fastness to light of these pigments.

As already mentioned the lead may partially be replaced by barium or strontium. Up to 80 per cent of the lead may thus be replaced whereby the fastness of the pigments against alkalies is increased, but it should be kept in mind that by such replacement the color strength is diminished. Pigments showing a good fastness against weak alkalies which at the same time have good other tinctorial properties, are those in which up to 40 per cent of the lead is replaced by barium or strontium.

The following examples will further illustrate the nature of this invention but the invention is not restricted to these examples.

Example 1

For the preparation of a mixed crystal pigment containing 97.5 per cent of $PbCrO_4$ and 2.5 per cent of $PbMoO_4$.

100 kilograms of lead nitrate are dissolved in 1.5 cubic meters of water and the pigment is precipitated by the addition of a solution of 56.7 kilograms of potassium chromate and 1.5 kilograms of ammonium molybdate in 1.5 cubic meters of water. A reddish yellow pigment having excellent color strength and great covering power is obtained.

Example 2

For the preparation of a mixed crystal pigment containing 95 per cent of $PbCrO_4$ and 5 per cent of $PbWO_4$.

A solution of 55.2 kilograms of potassium chromate and 4.3 kilograms of ammonium tungstate in 1.5 cubic meters of water is added to a solution of 100 kilograms of lead nitrate in 1.5 cubic meters of water. The brilliant yellow mixed crystal pigment thus precipitated has a great strength of color and also about twice the covering power of pure lead chromate.

Example 3

For the preparation of a mixed crystal pigment containing 55 per cent of $PbCrO_4$, 40 per cent of $BaCrO_4$ and 5 per cent of $PbMoO_4$ corresponding to the formula:

$$Pb_{0.6}Ba_{0.4}(Cr_{0.95}Mo_{0.05})O_4.$$

9.8 kilograms of barium chloride are added to a solution of 20 kilograms of lead nitrate in 500 liters of water whereby a part of the lead is precipitated as lead chloride. A solution of 18.4 kilograms of potassium chromate and 1 kilogram of ammonium molybdate in 500 liters of water is then introduced into the well stirred suspension. By filtration and drying a golden yellow pigment of the above composition is obtained.

Example 4

For the preparation of a pigment consisting of mixed crystals of the composition:

$$Pb(Cr_{0.75}S_{0.2}Mo_{0.05})O_4.$$

Three solutions of 25, 6.7 and 1.7 kilograms of lead nitrate in 300, 150 and 50 liters of water respectively are prepared. By the addition of solutions of 14.6 kilograms of potassium chromate, 2.9 kilograms of anhydrous sodium sulphate and 1 kilogram of ammonium molybdate in 300, 150 and 50 liters of water respectively, 24.2 kilograms of yellow $PbCrO_4$, 6.0 kilograms of white $PbSO_4$ and 1.8 kilograms of white $PbMoO_4$ are precipitated. The three precipitates are combined while intimately mixing them and after some time a scarlet red pigment is obtained which is filtered, washed and dried at 100° C.

Example 5

For the preparation of a pigment consisting of mixed crystals of the composition:

$$(Pb_{0.6}Ba_{0.4})(Cr_{0.55}S_{0.4}Mo_{0.05})O_4.$$

A solution of 9.7 kilograms of potassium chromate, 5.8 kilograms of anhydrous sodium sulphate and 1 kilogram of ammonium molybdate in 0.5 cubic meter of water is added to a solution of 20 kilograms of lead nitrate and 10.5 kilograms of barium nitrate in 0.5 cubic meter of water. The lemon yellow precipitate which is immediately precipitated and which consists of a mixture of the components becomes vermilion red in color after a short time owing to the formation of mixed crystals. The whole is worked up as described in Example 4.

Example 6

For the preparation of a pigment consisting of mixed crystals of the composition:

$$Pb(Cr_{0.775}S_{0.200}Mo_{0.025})O_4.$$

The pigment is precipitated from a solution of 100 kilograms of lead nitrate in 1.5 cubic meters of water by the addition of a solution of 47.7 kilograms of potassium chromate, 1.5 kilograms of ammonium molybdate and 8.7 kilograms of anhydrous sodium sulphate in 1.5 cubic meters of water. The original pale yellow precipitate becomes somewhat darker when allowed to stand. The pigment is filtered off well washed and dried at about 100° C.

Example 7

For the preparation of a pigment consisting of mixed crystals of the composition:

$$Pb_{0.8}Sr_{0.2}(Cr_{0.35}S_{0.6}Mo_{0.05})O_4.$$

5.3 kilograms of crystalline strontium chloride are added to a solution of 26.7 kilograms of lead nitrate in 500 liters of water, whereby a part of the lead is precipitated as lead chloride. A solution of 5.8 kilograms of potassium chromate, 8.7 kilograms of anhydrous sodium sulphate and 1 kilogram of ammonium molybdate in 500 liters of water is added to the well stirred suspension. After about half an hour the precipitate has assumed a vermilion red color. It is washed, filtered and dried at about 100° C.

Example 8

For the preparation of a red pigment consisting of mixed crystals of the composition:

$$Pb(Cr_{0.7}S_{0.2}Mo_{0.1})O_4.$$

38.3 kilograms of lead acetate are dissolved in 50 liters of water and a solution of 1.96 kilograms of ammonium molybdate, 13.6 kilograms of potassium chromate and 2.8 kilograms of anhydrous sodium sulphate in 50 liters of water is slowly added at ordinary temperature while stirring. First a brilliant yellow precipitate is formed which changes in the course of 1½ hours to vermilion.

Example 9

For the preparation of an orange red pigment consisting of mixed crystals of the composition: $Pb(Cr_{0.4}Mo_{0.6})O_4.$ A solution of 11.6 kilograms of ammonium molybdate and 7.8 kilograms of potassium chromate in 50 liters of water is added to a solution of 33.3 kilograms of lead nitrate in 50 liters of water. An orange red precipitate is obtained which when worked up in the usual manner forms a pigment of great color strength.

Example 10

A warm solution of 77.5 kilograms of potassium chromate, 10.5 kilograms of anhydrous sodium sulphate and 4.5 kilograms of ammonium molybdate in 5000 liters of water is added to a solution of 154 kilograms of lead nitrate and 13.5 kilograms of barium nitrate in 5000 liters of water warmed to between 40° and 50° C. The precipitate formed is worked up as usual and yields an orange pigment having the composition: $Pb_{0.9}Ba_{0.1}(Cr_{0.8}S_{0.15}Mo_{0.05})O_4.$

Example 11

A solution of 50 kilograms of potassium bichromate, 17.5 kilograms of potassium sulphate and 9.8 kilograms of ammonium molybdate in 5000 liters of water is slowly added, while stirring, to a solution of 166.5 kilograms of lead nitrate in 5000 liters of water. The pale yellow precipitate first formed is converted, while completing precipitation, into a clear red precipitate with a bluish tinge. The excess of acid is neutralized, the precipitate filtered off and dried at about 100° C. The pigment thus obtained has a very good covering power and corresponds to the formula: $Pb(Cr_{0.7}S_{0.2}Mo_{0.1})O_4.$

What we claim is:—

1. As a new article of manufacture mixed crystals suitable as yellow to red pigment coloring matters comprising lead chromate and at least one salt of lead with an acid selected from the group consisting of molybdic and tungstic acid.

2. As a new article of manufacture mixed crystals suitable as yellow to red pigment coloring matters consisting of from 40 to 95 per cent of lead chromate, from 2 to 15 per cent of lead molybdate, the rest being a salt of lead and an acid selected from the group consisting of tungstic and sulphuric acid.

3. As a new article of manufacture mixed crystals suitable as yellow to red pigment coloring matters containing lead chromate and at least one salt of lead with an acid selected from the group consisting of molybdic and tungstic acid and containing furthermore lead sulphate incorporated in their crystal structure.

4. As a new article of manufacture mixed crystals as claimed in claim 1 containing in addition to lead a salt selected from the group consisting of barium chromate, strontium chromate, barium sulphate, strontium sulphate, barium molybdate and strontium molybdate.

5. As a new article of manufacture mixed crystals suitable as yellow to red pigment coloring matters containing lead chromate and at least one salt of lead with an acid selected from the group consisting of molybdic and tungstic acid, containing lead sulphate incorporated in their crystal structure and containing in addition to the said lead salts a salt selected from the group consisting of barium chromate, strontium chromate, barium sulphate, strontium sulphate, barium molybdate and strontium molybdate.

6. As a new article of manufacture mixed crystals suitable as red pigment coloring matter having about the following composition: 70 molecular per cent of $PbCrO_4$, 20 molecular per cent of $PbSO_4$ and 10 molecular per cent of $PbMoO_4$.

7. As a new article of manufacture mixed crystals suitable as red pigment coloring matter having about the following composition: 80 molecular per cent of $PbCrO_4$, 5 molecular per cent of $PbSO_4$, 5 molecular per cent of $PbMoO_4$, 10 molecular per cent of $BaSO_4$.

8. As a new article of manufacture mixed crystals suitable as yellow pigment coloring matter having about the following composition: 55 molecular per cent of $PbCrO_4$, 40 molecular per cent of $BaCrO_4$ and 5 molecular per cent of $PbMoO_4$.

EKBERT LEDERLE.
HANS GEORG GRIMM.